United States Patent [19]
Pitner

[11] 3,790,240
[45] Feb. 5, 1974

[54] ROLLING BEARING ASSEMBLY WITH A REDUCED OPERATIONAL CLEARANCE

[75] Inventor: Alfred Pitner, Paris, France

[73] Assignee: Nadella, Malmaison, France; a part interest

[22] Filed: Dec. 21, 1972

[21] Appl. No.: 317,218

[30] Foreign Application Priority Data
Jan. 10, 1972  France .................................. 7200597

[52] U.S. Cl. .............................................. 308/207
[51] Int. Cl. ........................................... F16c 13/00
[58] Field of Search ................... 308/207, 189, 206

[56] References Cited
UNITED STATES PATENTS
3,630,586  12/1971  Pitner ................................. 308/184

Primary Examiner—Charles J. Myhre
Assistant Examiner—Frank Susko
Attorney, Agent, or Firm—Robert E. Burns; Emmanuel J. Lobato

[57] ABSTRACT

Radial rolling bearing assembly comprising a bore which supports, in angularly spaced regions, at least two respectively rigid and resilient supports for two adjoining bearing rings defining two outer raceways respectively for two annular rows of rolling elements guided in cage apertures. The resilient and rigid supports reduce the radial clearance for the rolling elements between the two outer raceways and a shaft.

23 Claims, 7 Drawing Figures

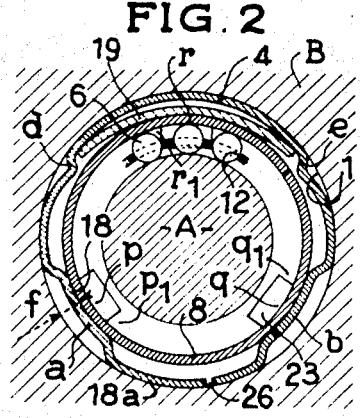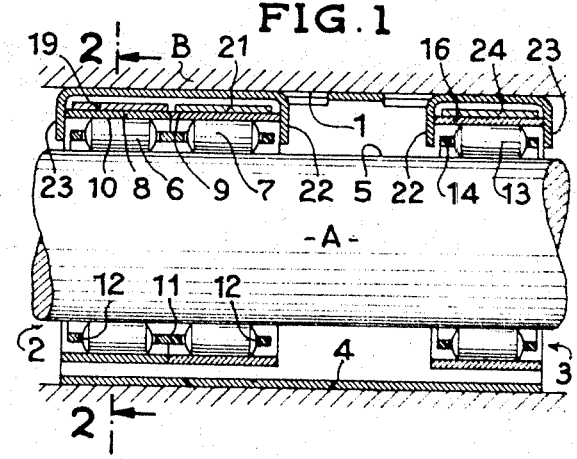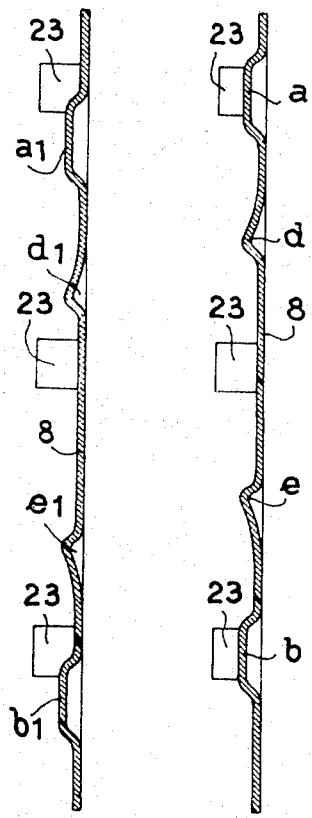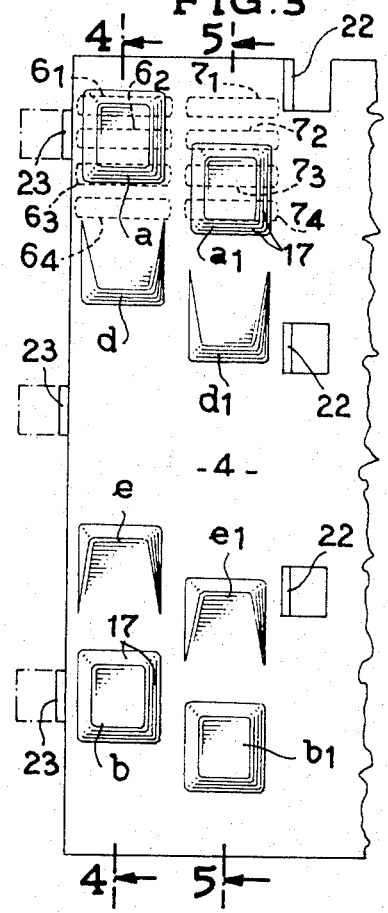

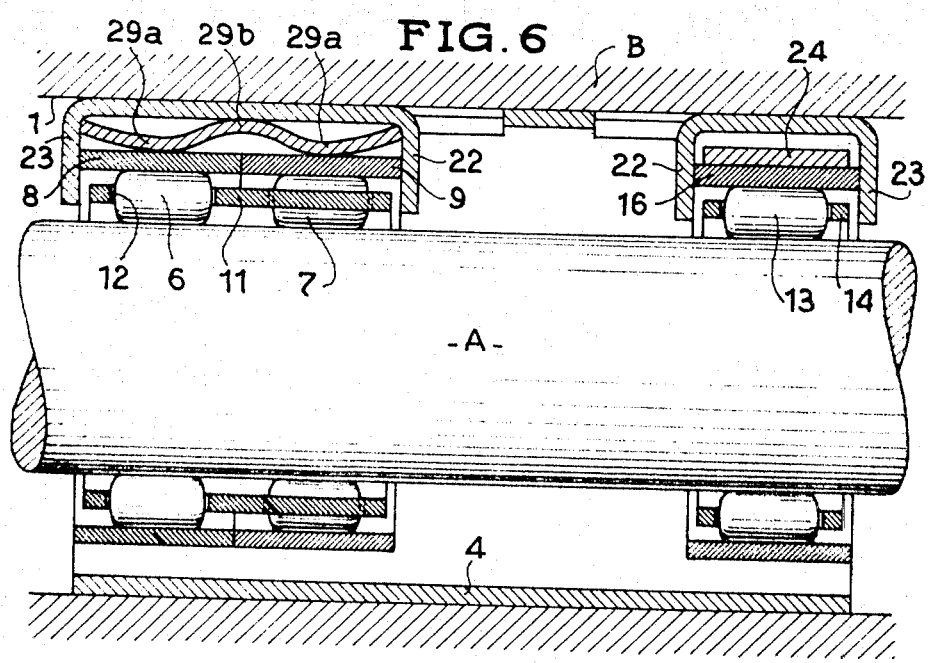
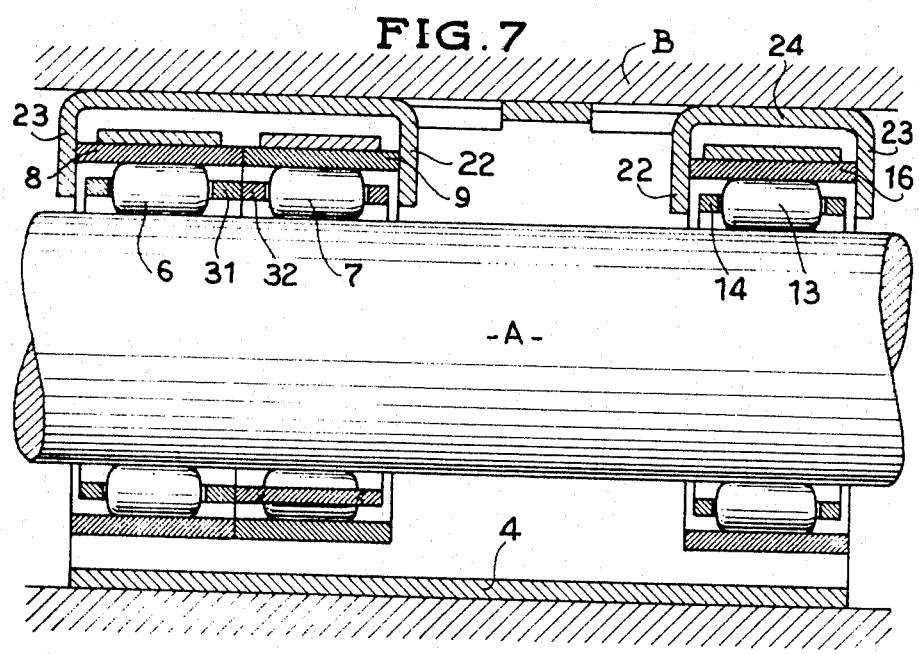

ROLLING BEARING ASSEMBLY WITH A REDUCED OPERATIONAL CLEARANCE

The present invention relates to a rolling bearing assembly comprising a bore which supports in angularly spaced regions at least two respectively rigid and resilient supports in the region of which the radial clearance for the passage of the rolling elements which are guided in cage apertures, is reduced under the effect of a radial deformation of the outer raceway for the rolling elements.

Such an arrangement is described in various forms in U.S. Pat. No. 3,009,748 and 3,630,586. The present invention concerns a modification of these structures and has for object to provide a rolling bearing assembly which affords a small or zero radial clearance or a negative radial clearance and has a remarkably reduced overall radial size and is particularly adapted to support a load which is higher than in the known arrangements and furthermore has the advantage over the known arrangements of reducing cyclic irregularities which occur upon the passage of the rolling elements in the regions of the supports.

The invention provides a rolling bearing assembly comprising at least two adjacent annular rows of rolling elements whose outer raceways are formed respectively on one and on the other of two adjoining thin rings each of which is deformed elastically inwardly in the region of the respectively rigid and resilient supports provided in the bore in the region of the two rows.

This arrangement increases, owing to the double row of rolling elements, the load-carrying capacity of the assembly and, provided that small diameter needle rolling elements are employed, reduces the overall size of the bearing assembly. Further, as the assembly has at least two annular rows of needles, it is possible to improve the quality of the centering by a judicious choice of the spring which radially deforms the raceway.

One of the advantages of the assembly according to the invention defined hereinbefore is that it reduces or eliminates the cyclic irregularities or jarring owing to the possibility of creating as it were a phase difference between the two rows of rolling elements and/or between the associated supports. This may be achieved by constructing the two adjacent rows of rolling elements in the form of two identical juxtaposed rolling bearings comprising therefore two independent cages and providing supports for the respective rolling bearings which are in axial coincidence. The phase difference is then created by a relative rotational sliding of the two cages in the course of bearing operation which substantially excludes any possibility of the rolling elements being in axial coincidence in which they would produced synchronized shocks. It is also possible to offset the supports so as to increase the possibility of a phase difference.

The phase difference may be improved, in the case where the two rows of rolling elements have independent cages, by providing a different number of cage apertures in the respective rows of rolling elements, and supports for one of the rows which may be offset or not offset relative to the supports of the other row.

Another arrangement consists in providing a single cage for both rows of rolling elements with equal numbers of apertures for each row with the apertures in axial coincidence, but adopting for the supports corresponding to one of the rows on angularly offset position with respect to the supports of the other row. A modification may consist in combining, with the offset supports, an unequal number of cage apertures.

With a single cage for both rows of rolling elements is also possible to obtain a phase difference by providing for both rows supports which are in axial alignment but offsetting the cage apertures of one row with respect to the cage apertures of the other row, the number of cage apertures pertaining to the respective rows being equal or different.

In the U.S. Pat. No. 3,630,586, the resilient support may be constituted for each ring by a bent resiliently yieldable strip supported at its ends in the bore and applied by its centre portion on the corresponding ring so as to create a radial compression producing a radial deformation of the ring.

It is also possible to provide for the construction of the resilient support a strip constituting a spring which extends axially and is supported in its middle portion by the bore and so shaped that it exerts on the two rings a radial compression on each side of this middle support which produces the required radial deformation of these rings.

The rigid support or supports provided for each of the rings may be constructed in the manner described in French Pat. No. 2,036,443 by pressing out a sheet which constitutes, after rolling, a sleeve engaged in the bore of the bearing support element.

For the complete assembly of a rotary shaft, there may also be provided in addition to the two adjacent rolling bearings, at least one other rolling bearing spaced from the two rolling bearings and comprising an arrangement for reducing, at least at two points, the clearance for the passage of the rolling elements. The two adjacent rolling bearings and the single additional rolling bearing may be integrated in a single sleeve.

An assembly according to the invention may be employed, for example, in electric apparatus in which there is a high radial stress on the bearing but in which the position of the shaft with respect to the rest of the apparatus must be determined with high and lasting precision owing to requirements as to electrical efficiency (air gap) or contact control angular positioning, the precision of such positioning depending precisely on the absence of substantial radial play. Such an apparatus may be an igniter of an internal combustion engine. It has, furthermore, the advantage, from the point of view of both this precision and vibrations and noise, of considerably reducing the cyclic variations in the position of the shaft.

Several embodiments of the assembly according to the invention will be described by way of example with reference to the accompanying drawings in which :

FIG. 1 is a longitudinal sectional view of an assembly, disposed around a shaft, of a double rolling bearing and a single rolling bearing which have a common sleeve engaged in the bore of a support element;

FIG. 2 is a sectional view taken on line 2—2 of FIG. 1;

FIG. 3 is a partial view of a sheet metal blank from which the sleeve shown in FIGS. 1 and 2 is produced;

FIGS. 4 and 5 are sectional views, taken on lines 4—4 and 5—5 respectively of FIG. 3;

FIG. 6 is a longitudinal sectional view of a modification of the assembly shown in FIG. 1, and FIG. 7 is a longitudinal sectional view of another embodiment of an assembly of a double rolling bearing and a single rolling bearing which have a single sleeve engaged in a bore in a support element.

FIG. 1 shows a shaft A rotatably mounted in a bore 1 of a housing B with interposition of two needle bearings 2, 3 which are spaced apart and have a common sleeve 4 fitted in the bore 1. The left rolling bearing 2 (as viewed in FIG. 1) comprises two adjacent annular rows of needles 6, 7 whose raceways 5, 10 are respectively formed by the outer surface of the shaft A and the inner surface of two adjoining thin steel rings 8, 9 which are supported by the sleeve 4. The needles of the two annular rows are mounted in a common cage 11 whose apertures 12 are in axial coincidence. As concerns the right rolling bearing 3 (as viewed in FIG. 1), it comprises a single annular row of needles 13 which are guided in a cage 14 and whose raceways are formed respectively by the outer surface of the shaft A and the inner surface of a thin steel ring 16 also supported by the sleeve 4.

This sleeve 4 is obtained by rolling blank sheet material represented in FIGS. 4 and 5 and having in the region of the row of needles 6 two regions $a, b$ which have undergone, by a press operation, a permanent radial deformation imparting thereto the shape of a rectangular cup or dish. These rectangular cups have relatively small dimensions so that their flanks 17 constitute somewhat stiffening ribs, whereby the regions $a, b$ of the sleeve, which face inwardly of the bore 1, constitute rigid supports for the ring 8.

It is advantageous to arrange, by an appropriate design of the press tool, that the radial dimension $f$ between the support surface 18 of the ring 8 and the outer surface 18$a$ of the sleeve bearing against the bore 1 be constant and independent of the thickness of the sheet (FIG. 2).

Two projecting portions $d$ and $e$, formed by a press operation in the sleeve 3, also in the region of the row of needles 6, at equal distances from the cups $a, b$ constitute circumferential supports for a bent spring strip 19 which has a radius of curvature exceeding that of the ring 8 and is radially urged in the middle part thereof into contact with this ring 8 and thus forms a resilient support for the ring which defines with the rigid supports $a, b$ a system applying in the three corresponding regions $p, q, r$ of the ring resilient deformations which reduce or render negative the annular clearance provided for the passage of the needles 6 between the raceways 5, 10 formed on the shaft A and ring 8.

In the region of the second annular row of needles 7 of the rolling bearing 2 there are also formed pressed-out cups $a_1, b_1$ which are identical to the cups $a, b$ but offset in the sheet metal blank (FIG. 3) in a direction parallel to the line through the two cups $a, b$ corresponding to the first row of needles so that the corresponding supports for the ring 9 are angularly offset in the rolling bearing 2.

Two projecting portions $d_1$ and $e_1$ are also provided in the region of the row of needles 10 at equal distances from the cups $a_1, b_1$ which, in the same way as the projecting portions $e, d$ of the row of needles 6, serve as circumferential supports for a spring 21 which, in the middle part thereof, radially bears against the ring 9 so as to afford a resilient support for the needles 7 under the same conditions as for the row of needles 6. Three regions $p_1, q_1, r_1$ are thus formed in the ring 9 which pertain to radial deformations and are circumferentially offset with respect to the corresponding regions $p, q, r$ of the row of needles 6.

In order to axially retain the rings 8, 9 of the bearing 2 and the ring 16 of the bearing 3 which are without a flange, tab portions 22, 23 are formed in the sleeve 4 by cutting and/or folding the blanks of sheet material shown in FIGS. 3, 4 and 5.

The bearing 3 having a single row of needles 13 also has rigid supports, which may be in axial coincidence with the supports $a, b$ of the row of needles 6, and a spring strip 24 which affords the resilient support under the same conditions as in the bearing 2.

Preferably, the ends of the blank of sheet material which forms the sleeve 4 are not welded after rolling so that the sleeve remains split at 26 whereby it can adapt itself to the bore 1 of the support element which in some applications, such as electrical machines, is produced with a relatively wide tolerance in the interest of cheapness in the contemplated application.

In FIG. 3 which shows diagrammatically groups of needles 6 and 7 located in each row in the region of the supports $a, a_1$ respectively or in the immediate vicinity of the supports, it has been assumed by way of example that the circumferential dimension of the supports $a$ and $a_1$ and that of the supports $b$ and $b_1$ were the same and equal to a magnitude between the pitch of the apertures 12 and double this pitch. Further, the angular offset of the supports $a$ and $a_1$ and that of the supports $b$ and $b_1$ is such that the relative position of the support $a$ and the needles $6_1, 6_2$ passing over this support is different from the relative position of the support $b$ and needles $7_3, 7_4$ which pass over the support $b$. This arrangement ensures a phase difference between the needles of the two rows with respect to the respective supports at the moment of passage over these supports.

The same result may be obtained by disposing the cups $a, b, a_1, b_1$ in axial coincidence, and offsetting the cage apertures, receiving the needles 6, 7, from each other.

In FIG. 6, the resilient support is afforded not by a circumferentially extending spring but by a spring strip 29 which extends in a direction parallel to the bearing axis and has a middle region, bent in a symmetrical manner so as to form a support region 29$b$ on the sleeve 4, and on each side of this region 29$b$ a curvature in the opposite direction which defines two regions 29$a$, 29$b$ whose convex surfaces are respectively urged radially against the rings 8, 9 and produce the required radial deformations. As compared with the rigid supports $a$, $b$ and $a_1$, $b_1$ which are assumed to be in axial coincidence, the phase difference pertaining to the needles 6, 7 of the respective rows is ensured owing to an angular offsetting of the cage apertures 12 containing the needles 6 with respect to the cage apertures containing the needles 7 the number of which is equal to the number of apertures for the needles 6.

FIG. 7 is similar to FIG. 1 which represents a longitudinal sectional view of an assembly of two rolling bearings 2, 3 having a common sleeve 4 engaged in the bore 1. In this embodiment, the rigid and resilient supports for one of the rings 8 of the double bearing 2 are in axial coincidence with those of the adjacent ring 9 but the needles 6, 7 of the two rows of needles are guided by two independent cages 31, 32, the number of needles in the respective cages being moreover different. This arrangement permits obtaining the required phase difference between the two rows of needles with respect to the supports.

As other arrangements for obtaining the phase difference of the needles of the respective rows of needles with respect to the supports the following may be adopted:

- a single cage for the two rows of needles, a different number of needles in the respective rows, and non-offset supports (embodiment shown in FIGS. 1–5);
- a single cage for both rows of needles, different numbers of needles in the respective rows and offset supports (embodiment shown in FIGS. 1–5);
- two independent cages for the needles of the respective rows, an equal number of needles in the two rows and non-offset supports, the phase difference being due exclusively to the relative angular sliding of the two rows (embodiment shown in FIG. 7);
- two independent cages for the needles of the respective rows, an equal number of needles in the two rows
- two independent cages, different numbers of needles in the two rows and offset supports (embodiment shown in FIG. 7).

Having now described my invention what I claim as new and desire to secure by Letters Patent is:

1. A radial rolling bearing assembly for combining with inner raceway means comprising means defining a bore having a longitudinal axis, two axially adjoining and contacting thin bearing rings coaxial with the bore and defining two outer raceways, two axially adjacent annular rows of rolling elements for respectively rolling along the two outer raceways, cage means defining apertures for respectively guiding the rolling elements, radially inwardly projecting rigid support means interposed between the bore and each ring, radially inwardly projecting resilient support means interposed between the bore and each ring, the rigid support means and the resilient support means acting on each ring in angularly spaced regions of the ring so that each ring has elastically inwardly deformed portions which reduce radial clearance for the rolling elements between the outer raceway and said inner raceway means.

2. An assembly as claimed in claim 1, wherein the cage apertures for the rolling elements of one of said rows of rolling elements are in axial alignment with the cage apertures for the rolling elements of the other row.

3. An assembly as claimed in claim 1, wherein the cage apertures for the rolling elements of one of the rows of rolling elements are angularly offset from the cage apertures for the rolling elements of the other row.

4. An assembly as claimed in claim 1, comprising the same number of cage apertures and rolling elements in respect to each row of rolling elements.

5. An assembly as claimed in claim 1, wherein the numbers of cage apertures provided for the rolling elements of the respective rows of rolling elements are different.

6. An assembly as claimed in claim 1, wherein the rigid support means for the respective rings are in axial alignment.

7. An assembly as claimed in claim 1, wherein the rigid support means for the ring of one of the rows of rolling elements are angularly offset with respect to the rigid support means for the ring of the other row of rolling elements.

8. A bearing assembly as claimed in claim 7, wherein the circumferential dimension of the rigid support means for the two rings, the amplitude of the angular offset of the rigid support means for the respective rings and the pitch of the cage apertures for the respective rows of rolling elements are such that the relative position of the rigid support means and the rolling elements of one row of rolling elements passing by said rigid support means is different from the relative position of the rigid support means and the rolling elements of the other row of rolling elements passing by the last-mentioned rigid support means.

9. An assembly as claimed in claim 1, wherein the cage means comprise a single cage.

10. An assembly as claimed in claim 1, wherein the cage means comprise two cages respectively associated with the two rows.

11. An assembly as claimed in claim 10, wherein the two cages are in adjoining relation.

12. An assembly as claimed in claim 1, wherein the resilient support means comprise a separate bent resilient strip for each ring and having a radius of curvature which exceeds the radius of curvatures of the ring and bore, the strip extending circumferentially of the bore and having two opposite end portions in supported relation to the bore and a middle portion which radially bears against the corresponding ring.

13. An assembly as claimed in claim 1, wherein the resilient support means for the two rings comprise a single bent resiliently yieldable strip which extends axially of the assembly, has a middle portion in supported relation to the bore and two portions which are adjacent opposite end of the strip and are in resilient contact with the respective rings.

14. An assembly as claimed in claim 1, wherein the rigid support means for each one of the rings consist of two rigid supports and the resilient support means for each one of the rings consist of a single resilient support, the two rigid supports and the resilient support being in angularly spaced relation.

15. An assembly as claimed in claim 1, comprising a sleeve of thin steel which is engaged in the bore and encompasses the two rings, the rigid support means comprising cup-shaped deformed portions of the sleeve.

16. An assembly as claimed in claim 15, wherein the resilient support means comprise a separate bent resilient strip for each ring and having a radius of cuvature which exceeds the radii of curvature of the ring and sleeve, the strip extending inside the sleeve circumferentially of the sleeve and having two opposite end portions in supported relation to the sleeve and a middle portion which radially bears against the corresponding ring.

17. An assembly as claimed in claim 15, wherein the resilient support means for the two rings comprise a single bent resiliently yieldable strip which extends inside the sleeve and axially of the sleeve and has a middle portion bearing against the sleeve and two portions which are adjacent opposite ends of the strip and are in resilient contact with the respective rings.

18. An assembly as claimed in claim 15, wherein said sleeve comprises radially inwardly extending portions for axially retaining the rings in the sleeve.

19. A unit for combination with inner raceway means and means defining a bore, comprising a sleeve, a first rolling bearing and a second rolling bearing both coaxial with and supported by the sleeve and in axially spaced relation to each other, the first rolling bearing comprising two axially adjoining and contacting thin bearing rings coaxial with the sleeve and defining two outer raceways, two axially adjacent annular rows of rolling elements for respectively rolling along the two outer raceways, cage means defining apertures for respectively guiding the rolling elements, cup-shaped deformed portions of the sleeve constituting radially inwardly projecting rigid support means for the two rings, radially inwardly projecting resilient support means for the two rings interposed between the sleeve and the two rings, the rigid support means and the resilient support means acting on each ring in angularly spaced regions of the ring so that each ring has elastically inwardly deformed portions which reduce radial clearance for the rolling elements between the outer raceway and said inner raceway means.

20. A unit as claimed in claim 19, wherein the resilient support means comprise a separate bent resilient strip for each ring and having a radius of curvature which exceeds the radii of curvature of the ring and sleeve, the strip extending inside the sleeve circumferentially of the sleeve and having two opposite end portions in supported relation to the sleeve and a middle portion which radially bears against the corresponding ring.

21. A unit as claimed in claim 19, wherein the resilient support means for the two rings comprise a single bent resiliently yieldable strip which extends inside the sleeve and axially of the sleeve and has a middle portion bearing against the sleeve and two portions which are adjacent opposite ends of the strip and are in resilient contact with the respective rings.

22. A unit as claimed in claim 19, wherein the second rolling bearing comprises a single annular row of rolling elements, a ring defining an outer raceway for the rolling elements and means for reducing in a plurality of regions of the ring the clearance between the outer raceway and said inner raceway means for the passage of the rolling elements.

23. A unit as claimed in claim 19, wherein the second rolling bearing comprises two axially adjoining thin bearing rings coaxial with the sleeve and defining two outer raceways, two axially adjacent annular rows of rolling elements for respectively rolling along the two outer raceways of the second rolling bearing, cage means defining apertures for respectively guiding the rolling elements of the second rolling bearing, cup-shaped deformed portions of the sleeve constituting radially inwardly projecting rigid support means for the two rings of the second rolling bearing, radially inwardly projecting resilient support means for the two rings of the second rolling bearing interposed between the sleeve and the two rings of the second rolling bearing, the rigid support means and the resilient support means acting on each ring of the second rolling bearing in angularly spaced regions of the ring of the second rolling bearing so that each ring of the second rolling bearing has elastically inwardly deformed portions which reduce radial clearance for the rolling elements of the second rolling bearing between the outer raceway and said inner raceway means.

* * * * *